UNITED STATES PATENT OFFICE.

THOMAS JONES, OF CHICAGO, ILLINOIS.

PLASTER.

SPECIFICATION forming part of Letters Patent No. 518,784, dated April 24, 1894.

Application filed September 19, 1892. Serial No. 446,272. (No specimens.)

*To all whom it may concern:*

Be it known that I, THOMAS JONES, of Chicago, Illinois, have invented a certain new and useful Improvement in Plaster, of which the following is a specification.

The unsatisfactory results obtained by the use of common lime mortar for covering wooden surfaces are too well known to need specific mention.

It is the object of my invention to avoid the defects of such plaster and to produce a material which will attain the utmost hardness and possess great tenacity at such moderate cost as to make it available generally as a wall covering.

In my patent, No. 451,560, dated May 5, 1891, I have specified the use of granite as an active and important ingredient in a wall plaster; but the difficulty of procuring granite in some localities and the cost of reducing it to a suitable condition for use tend to limit its usefulness and availability for the purpose.

An object of my present invention is to produce a wall plaster equal if not superior to the plaster described in said patent at a less cost. I therefore employ a material in lieu of the granite which is more extensively distributed and in most places easily accessible, and by means of which I attain the necessary hardness and tenacity in the plaster when said new ingredient is treated and compounded with other ingredients as herein described. To this end I first take gypsum rock and calcine it in a suitable kiln or oven, at a bright red heat, for one hour or thereabout, to destroy its quick-setting properties, when cool it is ready for mixture with the other ingredients of my new plaster. I take alkaline clay, preferably in the form of the aluminous shale of the coal measures, selecting those containing the least percentage of iron and the largest percentage of alkali (potash). These I calcine at a low red heat until they assume a light color, and until the carbonaceous matter contained therein is destroyed. I then grind these to a fine powder which is placed in a suitable vessel and to every one hundred pounds of said powder I add about thirty-three pounds of sulphuric acid, of ordinary commercial quality, and dilute with four or five times its bulk of water. I then boil the mixture for ten or twelve hours or longer, adding water from time to time to supply that lost by evaporation. It is then removed from the vat and allowed to dry, when it is fit for mixing with the over calcined plaster or gypsum. If, however, the shale or clay contains less than six per cent. of alkali (potash) I add enough of a salt of that substance (crude potash preferred) before withdrawing from the tank, to supply the deficiency and bring it up to that standard of strength; and I then stir up the mixture until the potash is thoroughly incorporated with and diffused through the mass, which is then withdrawn from the tank and allowed to dry, as before described. I then grind up together the over calcined gypsum and the mixture of shale or clay powder treated with sulphuric acid as described, in the proportion of fifteen to twenty parts by weight of the shale mixture to one hundred parts by weight of the gypsum, and when thoroughly mixed together and bolted it is ready for use. The potash may be regarded simply as a "carrier" of the silica, assisting in separating it from its combination with the alumina of the clay; but I prefer to regard it as uniting, at the moment of separation from the alumina, with a small portion of the detached silica, and in this way forming a minute quantity of acid silicate in the compound which subsequently parts with its silica to the lime of the gypsum, the liberated potash taking the sulphuric acid from the latter and forming potassa sulphate in the plaster which again acts to harden the plaster. It is certain, however, that the addition of a small amount of potash to the boiling clay mixture produces an instantaneous and remarkable effect on the clay, rendering it plastic and much less refractory, thus enabling its thorough working where without the addition of this ingredient such working is difficult. The object and purpose of boiling the clay in the sulphuric acid solution are to effect the perfect and uniform combination of the alumina of the clay with the sulphuric acid, a result which is not practically obtained by the mere steeping of the burnt clay in the acid solution even for a long time. By keeping the mixture of clay and sulphuric acid at the boiling point, I accomplish in a few hours what would take as many weeks to accomplish by the steeping process. The use of a definite proportion of acid to the clay as above described insures a definite and uniform result, whereas in my former mentioned patent, the proportion of acid taken up by the clay was indefinite and variable, and the results were not uniform.

To apply the plaster to walls or ceilings I mix the plaster with an equal bulk of sand, and add water sufficient to make it plastic and then apply in the usual way. It may be finished in one or more coats. If two coats are intended, I allow the first coat to become dry and then mix my plaster with an equal bulk of lime putty, and add enough water to bring the mass to a proper consistence, then apply in all respects in the same manner as ordinary plaster "finish."

I claim—

1. As a composition of matter, a compound for plastering in the form of a powder and containing over calcined gypsum, sulphate of alumina, sulphate of potash, silicate of potash and free silica in a finely divided condition, in substantially the proportions herein stated.

2. The herein-described process for the production of plaster, consisting in calcining clay, boiling it with sulphuric acid, adding potash thereto and mixing therewith over-calcined gypsum in about the proportions stated.

THOMAS JONES.

Witnesses:
C. C. LINTHICUM,
N. M. BOND.